Figure 1:
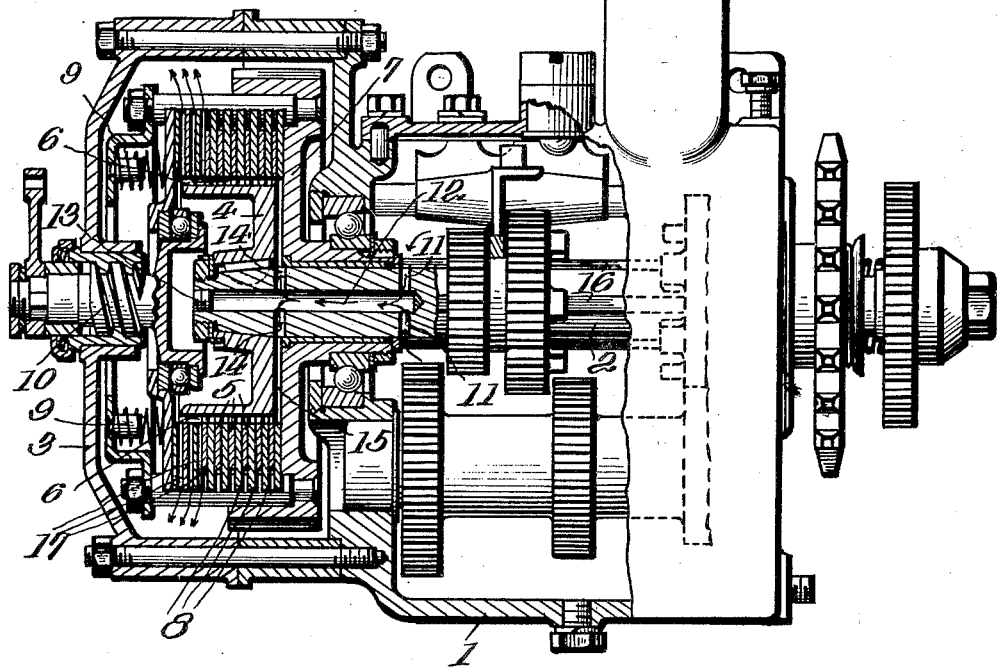

Patented Feb. 12, 1929.

1,702,116

UNITED STATES PATENT OFFICE.

EARL E. HOFFMAN, OF SPRINGFIELD, MASSACHUSETTS, ASSIGNOR TO INDIAN MOTO-CYCLE COMPANY, OF SPRINGFIELD, MASSACHUSETTS, A CORPORATION OF MASSA-CHUSETTS.

LUBRICATED MULTIPLE-DISK CLUTCH.

Application filed June 22, 1927. Serial No. 200,591.

The invention relates to new and useful improvements in multiple disk clutches, and more particularly to a construction of clutch whereby the same is made self-lubricating.

An object of the invention is to provide a multiple disk clutch having a plurality of associated driving and driven disks, with means for circulating a lubricant across the inner edges of the driving disks from one side to the other, whereby the lubricant may be fed by centrifugal force between the disks for lubricating the contacting faces thereof.

A further object of the invention is to provide a multiple disk clutch of the above type, wherein the lubricant is fed to said disks at one side thereof, and the disk or disks at the other side thereof are provided with radial passages through which the oversupply of lubricant passes, thus creating a vacuum feed of the lubricant.

A still further object of the invention is to provide a multiple disk clutch of the above type wherein the clutch is located in a closed housing, and the driving disks are operated by a driving shaft projecting into the housing, with means whereby the driving shaft supplies the lubricant for lubricating the disks.

A still further object of the invention is to provide a multiple disk clutch having a lubricating means of the above type which is associated with a transmission gear running in a casing, supplied with a lubricating oil, with means whereby the driving shaft causes the supply of lubricant to pass into the housing and to the disks and the surplus returned to the casing.

These and other objects will in part be obvious and will in part be hereinafter more fully disclosed.

In the drawings which show by way of illustration one embodiment of the invention—

Figure 2:
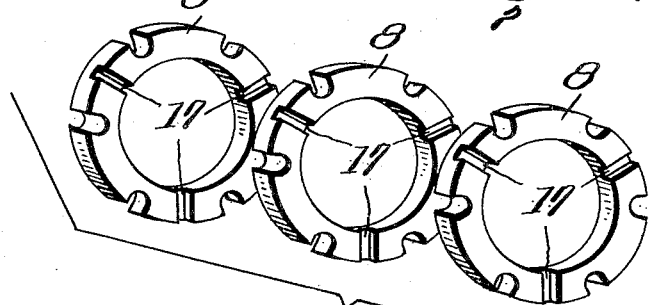

Figure 1 is a sectional view showing more or less diagrammatically a multiple disk clutch associated with a transmission mechanism in a motorcycle, and provided with my improved lubricating means; and Fig. 2 is a view in perspective showing the raybestos disks with the radial slots.

The invention is directed broadly to a lubricating multiple disk clutch. That is, a multiple disk clutch which is self-lubricating, so that the lubricant is supplied to the gripping faces of the driving and driven disks, thus eliminating all chatter in the disks of the clutch and providing a very smooth running clutch. The multiple disk clutch may be made of any desired form of construction which includes a plurality of driving disks and a plurality of driven disks associated therewith for connecting the driving member to the driven member. Preferably, the multiple disk clutch runs in a closed housing. A driving shaft projects into the housing, and the driven member is mounted to rotate freely on the shaft. The driving shaft extends through a transmission casing, which is supplied with oil, so that the transmission gears run in oil. The shaft is provided with two or more radial passages leading to a central passage extending longitudinally of the shaft from a point within the casing to a point within the housing. At the end of the shaft in the housing, the passage is closed, but two or more radial passages extend into the shaft to said central passage. This shaft is provided with ribs or splines which cause the oil to pass in through the radial passages leading to the casing, along the central passage, and thence out through the radial passages, leading to the housing. The driving member which is connected to the shaft is spaced slightly from the driven member, so that the lubricant can flow outwardly between the two. The driving disks are so constructed as to provide a passage across the disks from one side thereof to the other at the inner edges of the driving disks. One or more of the disks at the outside of the clutch are provided with radial passages so that the surplus oil may be forced out through these passages, while a certain supply of lubricant is carried between the faces of the cooperating disks for lubricating the same. The oil which passes out through the radial passages is directed into the housing, and then is led back through a suitable passage into the casing. Thus it is that the oil is caused to circulate from the casing into the housing for lubricating the faces of the gripping disks, and this circulation is brought about in part by the ribs on the driving shaft, the centrifugal force acting on the lubricant in the passage leading out from the driving shaft, and in part by the vacuum created by the excess oil passing out through the radial passages in the disks.

Referring more in detail to the drawings, I have shown my improvement as applied to a multiple disk clutch used in connection with a motorcycle. In the drawings, a casing 1 is shown, which contains the transmission mechanism including a driving shaft 2 which extends through the casing and into the housing 3 in which is located the multiple disk clutch. On the end of the shaft 2 in the housing is a driving member 4, and associated with and connected to this driving member is a series of disks 5, 5. These disks are splined to the driving member, and turn therewith. This is brought about through projections of the usual character. There is a sufficient space, however, between the disks and the driving member so as to provide a passage 6 through which the lubricant may pass from the inner side of the clutch to the outer side thereof, as shown in Fig. 1 by the arrows. This passage from the inner side of the clutch to the outer side thereof may be formed by drilling a hole so as to provide the space referred to. There are two passages indicated in Fig. 1 of the drawing which are diametrically opposed to each other. This means for providing free flow of the oil from the inner side to the outer side of the clutch disk may be provided in any suitable way.

A driven member 7 is mounted to rotate freely in the casing and on the shaft 2 which passes through the hub of this driven member. Associated with this driven member is a series of disks 8. The disks 5 and 8 are alternately arranged in the usual manner. This disk clutch, so far as the connecting of the driving and driven parts together, is concerned, is of the usual construction. Springs 9 are provided for forcing the plates or disks into contact for connecting the parts, and a member 10, when oscillated, is moved endwise by cam means for releasing the spring tension on the plates.

The shaft 2 is provided with two or more radial passages 11, 11, and a central longitudinal passage 12 which extends from the radial passages toward the end of the driving shaft as viewed in Fig. 1. The end of the passage 12 is closed by a suitable plug 13. The shaft is also provided with two or more radial passages 14, 14 which lead outwardly from the central passage at points between the driving member 4 and the driven member 7. These parts are spaced so as to provide a passage 15 leading radially outwardly to the inner edges of the driving disks 5, 5.

The shaft is provided with ribs or splines 16, 16 associated with the passages 11, 11, so that oil or lubricant in the casing 1, is fed in through these radial passages 11, 11 to the central passage 12, thence out through the passages 14, 14 and the passage 15, to the passages 6, which extend across the inner edges of the disks.

The outer or driven disks are raybestos disks. A certain number of these disks at the outside of the clutch are formed with radial passages 17, and the metallic driving disks which were associated with these slotted raybestos disks are omitted. Thus it is that the surplus oil passing along the passages 6, will move out through these passages or grooves 17 through the centrifugal force acting thereon. The oil is thus delivered to the housing for the clutch, and will pass in the usual manner from the housing back into the casing 1.

From the above it will be apparent that I have provided a multiple disk clutch which, in effect, runs in oil. The driving shaft feeds the oil out into the housing, and the centrifugal force and vacuum pull incident thereto, causes the oil to flow across the inner edges of the disks, and when the disks are open, a certain amount of the lubricant will pass along the face of the disks and thus lubricate the same. When the clutch is again engaged, the disks are thoroughly lubricated, and all chatter is eliminated and a smooth action obtained.

It will be obvious that minor changes in the details of construction and arrangement of the parts may be made without departing from the spirit of the invention as set forth in the appended claims.

Having thus described the invention, what I claim as new and desire to secure by Letters-Patent, is—

1. A multiple disk clutch including in combination, a casing, a housing carried thereby, a shaft extending through the casing into the housing, a driving member carried by the end of the shaft, a driven member in said housing, a series of disks for connecting the driving member to the driven member, said shaft having a central passage extending from a point within the casing to a point within the housing, and radial passages leading from one end of said central passage to the casing and from the other end of said central passage to the housing, said driving and driven members being spaced to provide a passage for the lubricant passing from the casing through the passages in the shaft, said clutch having a passage extending across the inner edges of the disks, whereby the lubricant is fed by centrifugal force between the disks of the clutch.

2. A multiple disk clutch including in combination, a casing, a housing carried thereby, a shaft extending through the casing into the housing, a driving member carried by the end of the shaft, a driven member in said housing, a series of disks for connecting the driving member to the driven member, said shaft having a central passsage extending from a point within the casing to a point within the housing, and radial passages leading from one end of said central passage to the casing and from the other end of said central passage to the housing, said driving and driven members being spaced to provide a passage for the lubricant passing from the casing through the passages in the shaft, said clutch having a passage extending across the inner edges of the disks, whereby the lubricant is fed by centrifugal force between the disks of the clutch, certain of said disks at the outer face of the clutch being provided with radial passages, so that the excess lubricant is carried by centrifugal force out through said passages, and thus creates a vacuum pull on the lubricant for causing the same to circulate.

3. A multiple disk clutch including in combination, a casing, a housing carried thereby, a shaft extending through the casing into the housing, a driving member carried by the end of the shaft, a driven member in said housing, a series of disks for connecting the driving member to the driven member, said shaft having a central passage extending from a point within the casing to a point within the housing, and radial passages leading from one end of said central passage to the casing and from the other end of said central passage to the housing, said driving and driven members being spaced to provide a passage for the lubricant passing from the casing through the passages in the shaft, said clutch having a passage extending across the inner edges of the disks, whereby the lubricant is fed by centrifugal force between the disks of the clutch, certain of said disks at the outer face of the clutch being provided with radial passages so that the excess lubricant is carried by centrifugal force out through said passages, and thus creates a vacuum pull on the lubricant for causing the same to circulate, said shaft having ribs thereon in the casing adjacent the radial passages leading to the casing for aiding in directing the oil into said last-named passages.

In testimony whereof, I affix my signature.

EARL E. HOFFMAN.